May 6, 1969

S. A. BULIN 3,442,068

AUTO-GROUND SPEED CONTROL FOR SELF-PROPELLED COMBINE

Filed Aug. 15, 1966

INVENTOR.
SHELLEY A. BULIN.

United States Patent Office 3,442,068
Patented May 6, 1969

3,442,068
AUTO-GROUND SPEED CONTROL FOR
SELF-PROPELLED COMBINE
Shelley A. Bulin, Davenport, Iowa, assignor to J. I. Case
Company, Racine, Wis., a corporation of Wisconsin
Filed Aug. 15, 1966, Ser. No. 572,553
Int. Cl. A01d 41/02, 69/00
U.S. Cl. 56—20                                              11 Claims

ABSTRACT OF THE DISCLOSURE

A harvesting machine which has spaced threshing elements biased to a first position to define an optimum rate of feed between said elements. The machine further includes motor means variable to vary the rate of crop feed to the elements with means for varying the supply of pressure fluid to the motor means in response to movement of the elements from the first position.

---

Figure 1:
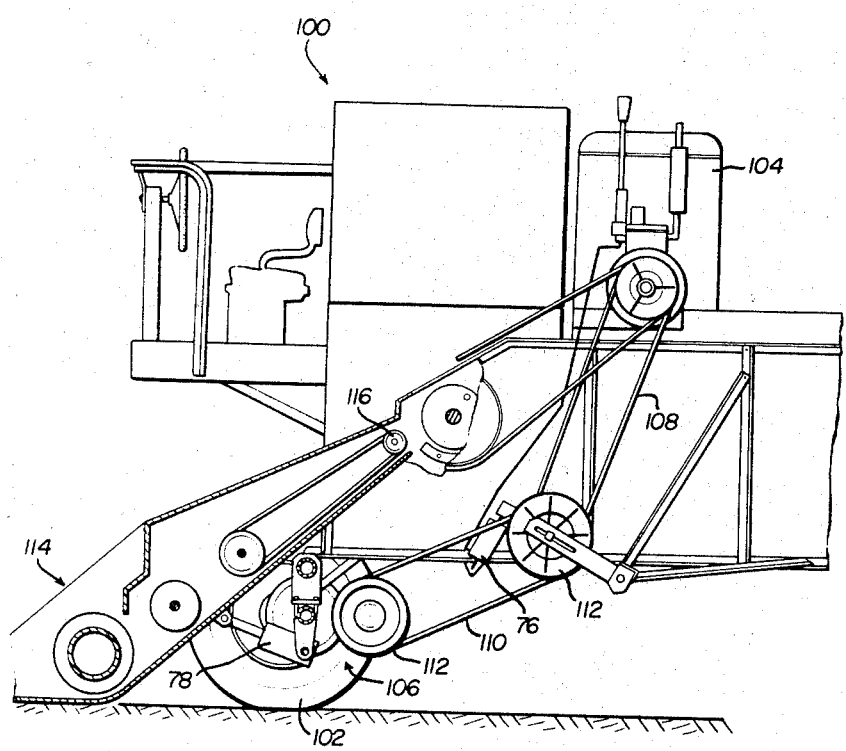

This invention relates generally to the control of crop load during the operation of a combine. More specifically, this invention relates to selective automatic control of the rate of crop fed to a combine responsive to the separation pressure between the threshing cylinder of the combine and its associated concave member.

In the operation of a combine in a field, it is important to control the rate at which crop is fed to the combine in order to prevent overloading of the machine. If the machine is overloaded, fouling or mechanical breakdown may occur. It has been a practice to provide a manual control of the crop load. Typically, the operator of the combine listens for the relative noise level of the machine. When the noise reaches what he considers a dangerous level, he slows down the machine in order to reduce the crop load. Mechanisms for accomplishing such control are described, for example, in the U.S. Patent No. 2,794,-438 to S. C. Heth and No. 2,931,363 to S. A. Bulin, the present inventor.

It has also been a practice to provide mechanical control of crop load. Typically, this is done by sensing forces in the drive train on various continuously moving components of the combine. Although some success has been achieved by this practice, often it is characterized by complicated mechanical contrivances that are sensitive to engine speed parameters that often change independently of actual crop load. This results in substantially increased maintenance and in discontinuous combine operation because of the necessity to often stop the combine and readjust the mechanism in the field. An example of a mechanism of this type is found in U.S. Patent No. 2,639,569 to S. F. Pasturczak.

Because of changes in terrain, crop growth density, and other field conditions, it is desirable to afford a combine operator means of readily interchanging crop load responsive controls of combine operation. For example, because of grade, the operator may prefer changes in crop load to be reflected in a change in combine ground speed rather than a change in header height or vice versa.

It is an object of this invention to automatically monitor the instantaneous crop load of a combine by sensing variations in the separation between a threshing cylinder and its associated concave.

Another object of the invention is to control a fluid pressure device which determines the rate of crop feed to the cylinder and concave of a combine by sensing variations in the separation of the cylinder and concave and translating these variations into variations of flow of a fluid which operates said fluid pressure device.

A further object of the invention is to provide a method of and apparatus for controlling the crop load of a combine either manually or automatically that is relatively free from a need for frequent field adjustment and is relatively insensitive to changes of engine speed that do not reflect changes in crop load.

Another object of the invention is to provide a combine with a plurality of devices controlling different parameters of combine operation such as ground speed and header height and with means for selectively operating one or more of the control devices in response to variations in crop load.

These and other objects are accomplished by providing a threshing cylinder of a combine with an associated concave that is linked to a lever pivotally attached to the combine. Increased crop load on the threshing cylinder forces the concave to separate further from the cylinder. This motion of the concave member pivots the lever. This pivoting of the lever is opposed by spring biased mechanical means. The mechanical means biases a hydraulic shunt valve to closure. When this bias is overcome by the pivoting of the lever, the shunt valve is opened, and hydraulic pressure is bled from hydraulically actuated apparatus controlling either the ground speed of the combine or its header lift mechanism. Another valve is provided which can be manually operated to block the shunt action of the first valve.

Other objects of this invention will appear in the following description and appended claims, referring to the accompanying drawings forming a part of this specification.

ON THE DRAWINGS

Figure 2:
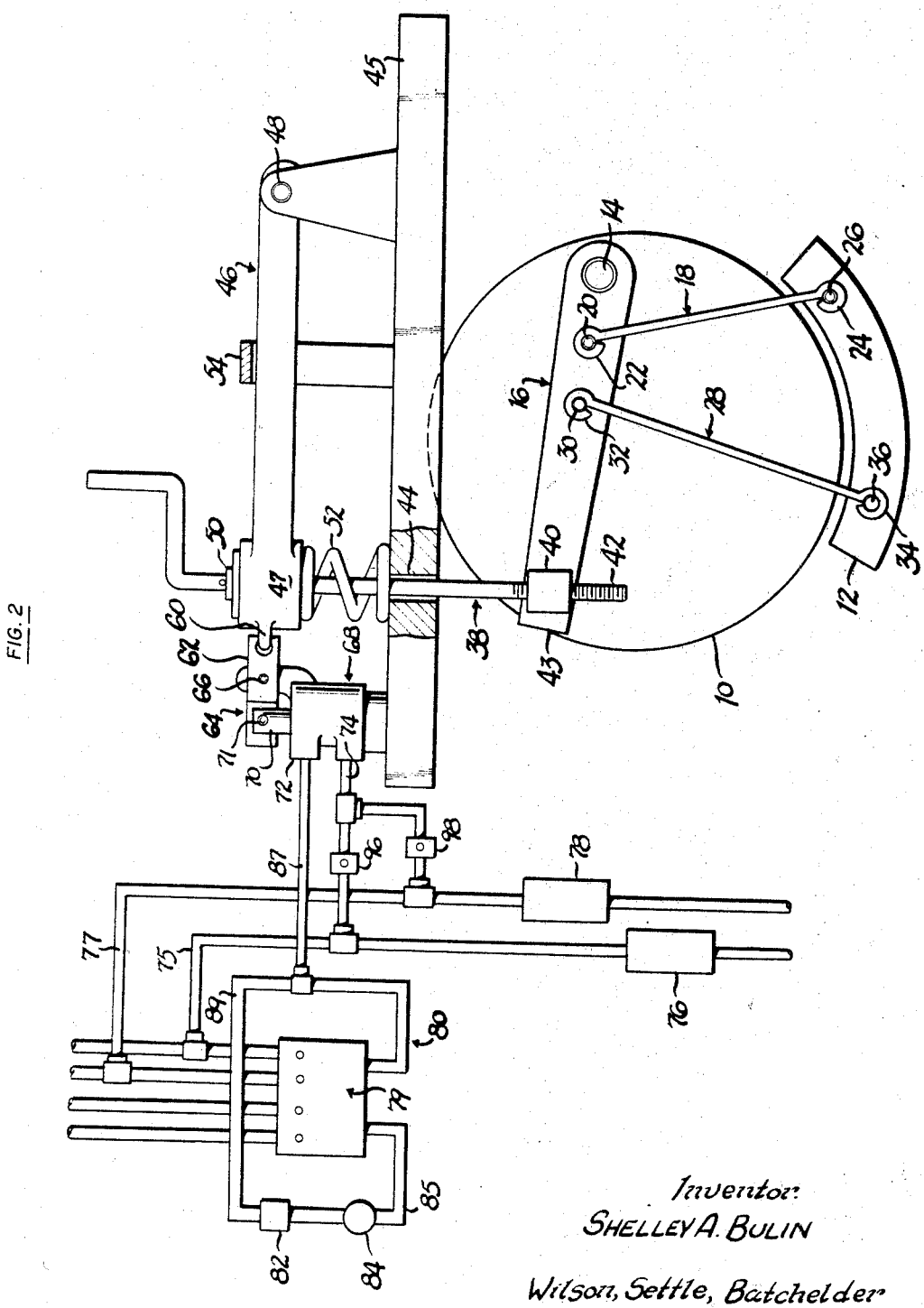

FIGURE 1 shows a harvesting machine capable of having the present invention incorporated therein; and FIGURE 2 shows a schematic representation of a preferred embodiment of the present invention.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein is for the purpose of description and not of limitation.

AS SHOWN ON THE DRAWINGS

FIGURE 1 of the drawings generally discloses a combine 100 which has the present invention incorporated therein and which includes wheels 102 (only one being shown) driven by an engine 104 through a differential and transmission 106. The driving connection may include belts 108 and 110 with a plurality of pulleys 112 supporting the belts. At least one of the pulleys 112 has relatively movable elements to provide a variable speed mechanism and preferably the elements are adjustable through a hydraulic control device, as will become apparent hereinafter. The combine 100 also includes a header 114 adapted to be raised and lowered about a pivot axis 116.

In FIGURE 2, there is shown a threshing cylinder 10 and an associated paraxial concave member 12 employed in the combine 100. Pivotally attached on a pin 14 on the combine 100, is a lever arm 16. The concave member 12 is attached to the lever arm 16 by rods 18 and 28.

The rod 18 is pivotally attached near its end 22 on the lever 16 by a pin 20. Near its other end 24, the rod 18 is pivotally attached to the concave member by a pin 26. The rod 28 is pivotally attached to the concave member by a pin 36.

Another rod 38 is pivotally secured to the lever 16, by an internally threaded collar 40, on its mating threaded end 42. The collar 40 is near that end 43 of the lever 16 most remote from the pin 14. In its normal position, rod 38 is in a substantially vertical upright position.

An aperture 44 is provided on the combine frame 45 for the passage of the rod 38 through it. A pin 48 pivotally attaches a lever 46 to the combine. When the lever 46 is in its normal position, it extends in a substantially horizontal direction, forming a substantially right angle with the rod 38 passing through the aperture 44. A cotter pin 50 above the lever 46, and a snap ring (not shown) below the lever 46 secure the rod 38 to the lever 46.

A helical spring 52 is secured to the combine below the lever 46, and extends upward into contact with the lever 46. It surrounds the rod 38 and is substantially paraxial with it. The spring 52 biases the lever 46 from the aperture 44 in an upward direction.

A bracket 54 overhanging the lever 46 is fixed to the combine to limit the upward travel of lever 46.

An extension member 60 is provided on the end 47 of lever 46 near the aperture 44. This extension member 60 engages a bifurcated arm portion 62 of a lever member 64. The lever 64 is pivotally mounted on a pin 66 which is fixed on a valve assembly 68.

The bifurcated arm portion 62 as illustrated in FIGURE 1 to be selectively positioned so as to engage the extension member 60, such that when the lever 46 is moved in a downward direction, the lever 64 is rotated about the pin 66, which in turn raises a slidable spool member 70 pivotably attached to lever 64 by pin 71. The spool member 70 then opens the valve 72 within the valve assembly 68.

The valve 72 is a hydraulic valve operable to conduct fluid under pressure. It is fed by a line 74 that conducts hydraulic fluid from a hydraulic line or conduit of hydraulic pressure supply 75 to a control mechanism 76, or from a hydraulic supply 77 to a control mechanism 78.

The control mechanism 76 is preferably a variable speed cylinder that controls the speed of the combine responsive to its extension. Its extension is controlled by the amount of hydraulic pressure provided to the cylinder. The control device 78 may be hydraulic cylinder means for varying the lift of the header of the combine. The extension of the cylinder of device 78 is controlled by the relative amount of hydraulic pressure supplied to it from line 77, and this extension is the control factor in varying the height of the header. Other hydraulic actuated combine operation controls may be utilized in substitution of or in conjunction with control mechanisms 76 and 78, where such additional controls are also responsive to hydraulic pressure supplied to them. The cylinders 76 and 78 may be connected respectively to speed control means and to header lift control means in the general manner indicated for example in patents, No. 2,749,696 to W. J. Innes, No. 2,639,569 to S. F. Pasturczak, and No. 2,842,925 to L. E. Allen.

When the valve 72 is open, hydraulic fluid under pressure, normally fed to the cylinder controlling apparatus 76 and 78, is bled from such input through the shunt and back to a return line to the hydraulic reservoir in the system providing hydraulic pressure for the combine. The amount of oil fed back to the return line depends on the degree to which valve 72 is opened, so the valve 72 provides a range of speed control.

In schematic form, a portion of the hydraulic system shown generally at 80 is described. This hydraulic system comprises a hydraulic reservoir 82, a hydraulic pump 84, a pressure line 85 to feed various hydraulically actuated components such as the aforementioned variable speed control device 76 and header lift control device 78, or other controls such as a reel speed control cylinder, from the group of control valves 79. A return line 89 from each of these control devices and valve group 79 is provided to the source 82. The output 87 from the valve 72 flows into the return line 89.

Valves 96 and 98 are provided intermediate the bleeder line 74 and hydraulic pressure supply lines 75 and 77 respectively. Each of the valves 96 and 98 can be selectively actuated to an open or closed position at the discretion of the combine operator. When a valve 96 or 98 is open, the automatic monitoring feature of this invention is conditioned to be operable to open the control cylinder with which the valve communicates. The closing of a valve 96 or 98 acts as a mechanical override to automatic crop load monitoring of the control device with which the valve hydraulically communicates.

OPERATION

When the combine tends to become over-loaded, the distance between the concave and the cylinder is increased. Because of the increase of this distance, the rods 18 and 28, connecting the concave to the lever 16, tend to rotate the lever 16 so as to lower the rod 38 which is connected to the end of the lever 16.

As the rod 38 lowers, it is opposed by the yieldable bias of the spring 52. However, as the rod 38 lowers, by virtue of the lever 46 being engaged by the cotter pin 50, the lever 46 is also lowered.

As the lever 46 lowers, it engages one end of the lever 64 and causes that lever to rotate so as to raise the rod 70 connected to lever 64, which opens the valve 72.

As the valve 72 opens, hydraulic pressure is relieved from the control cylinders 76, 78, with which bleeder line 74 communicates. As this hydraulic pressure is reduced on the control cylinders 76 or 78 or other control cylinder, the speed of the combine is reduced or the header is lifted or some other combine function is actuated to reduce crop load, such as reduction of concave-cylinder separation. In either case, the result is that the rate of grain being fed into the combine is reduced. This prevents clogging or mechanical breakdown of the combine due to overloading.

When the rate of grain being fed to the combine is reduced, the concave moves upwardly toward the cylinder, narrowing the gap between the concave and the cylinder. When this occurs, by virtue of the rods 18 and 28 linking the concave to the lever 16, the lever 16 is counter-rotated upwardly from its former downward position. This has the effect of raising the rod 38, which is connected to the lever 16. When the rod 38 is raised, this forces the lever 46 to resume its normal position. When the lever 46 resumes its normal position, so does the lever 64.

When the lever 64 resumes its normal position, the rod 70 connected to it, that controls the relative opening or closing of the valve 72, is restored to its normal valve closing position. This has the effect of cutting off the flow of hydraulic fluid through the valve 72. When the valve 72 is closed, hydraulic flow is no longer bled from the input of the control cylinders 76 and 78.

The operator can override the automatic control by actuating manually the valves 96, 98 to a closed position. This has the effect of preventing the bleeding of hydraulic fluid from the cylinders 76, 78. Thus the automatic control can be selectively readily disengaged without interrupting the continuous operation of the combine.

It can be seen from the above description of the operation of the preferred embodiment of this invention, that means have been provided for selectively automatically controlling the rate of feeding grain into the combine so that, at a predetermined threshold of rate of grain loading, either the speed of the combine or the header lift or other crop load control can be monitored to a stable rate of grain feeding without overloading the machine. From moment to moment in field operation, the operator can choose either (1) complete automation of crop load monitoring by simultaneous automatic control of several crop load controls each responsive directly to crop load without depending on extraneous factors such as engine speed variation due to terrain grade changes; or (2) complete automation of crop load monitoring by selecting only one or two such crop load controls while excluding others; or (3) completely manually overriding all automatic control of crop load. This full range of control available to the operator results from the provision of an accurate response of variations in crop load by means biased against and responding to separation of a concave member associated with the threshing cylinder.

I claim:

1. In a combine having an engine for propelling the same and threshing means including first and second spaced elements between which a crop is fed in the operation of said combine, means slidably retaining said elements in predetermined spaced relation to define an optimum rate of crop feed and a control device for controlling the rate at which crop is fed to said threshing means, said control device including fluid pressure means operatively connected to said engine for varying the speed thereof to control said optimum rate of crop feed to said threshing means, means for varying fluid supplied to said fluid pressure means, and crop sensing means operatively connected to one of said elements and to said varying means for operating said varying means in response to movement of said elements from said predetermined spaced relation.

2. In a harvesting machine having spaced threshing elements, the combination therewith of means yieldably retaining said elements in a first spaced position to define an optimum rate of crop feed, fluid motor means variable to maintain said optimum rate of crop feed, means supplying fluid to said motor means and including valve means regulating the amount of fluid supplied to said motor means, and sensing means operatively connected to one of said elements and to said valve means for opening and closing said valve means in response to movement of said elements from said first position to maintain said optimum rate of crop feed.

3. The apparatus of claim 2 in which said means supplying fluid to said motor includes a main supply path leading to said motor and a bleed line leading from said main supply path to a reservoir, said valve means being connected in said bleed line.

4. The apparatus of claim 3 in which said bleed line has an additional manually operable valve means therein for opening and closing said bleed line to activate and deactivate said first-named valve means for automatic operation.

5. The apparatus of claim 2 in which said sensing means includes a lever connected to said valve means controlling by lever movement the degree to which said valve means is opened and closed, and means linking said lever to said one of said elements for moving said lever in response to variations of the separation between said elements.

6. The apparatus of claim 5 in which said linking means include a second lever connected to said first named lever and to said one of said elements and moved in response to increased and decreased separation between said elements to thereby move said first lever to control said valve means.

7. In a combine having threshing cylinder and concave elements, means yieldably retaining said elements in a predetermined position to define an optimum rate of crop feed, the combination therewith of a hydraulic cylinder variable to maintain said optimum rate of crop feed, a hydraulic supply path supplying fluid to said hydraulic cylinder, a bleed line leading from said supply path to a reservoir for bleeding fluid from said supply path, a valve connected in said bleed line for varying the amount of fluid bled from said supply path, a lever connected to said valve controlling by lever movement the degree to which said valve is opened and closed, and means linking said lever to one of said elements for moving said lever in response to movement of said one element from said predetermined position.

8. The apparatus of claim 7 in which said combine includes an engine for propelling said combine, and said hydraulic cylinder controls the speed of said engine.

9. The apparatus of claim 7 in which said combine includes a header for cutting a crop, and said hydraulic cylinder controls the height at which said header cuts the crop.

10. The apparatus of claim 7 in which said linking means includes another lever connected to said firstnamed lever and to said one of said elements and moved in response to increased and decreased separation between said elements, and a link between said levers, said yieldable means comprising spring means urging said first lever to a predetermined position.

11. A method of controlling the rate at which crop is fed to a combine in the operation of said combine, said method comprising the steps of, defining a predetermined separation between a threshing cylinder element and a concave element to define an optimum rate of crop feed, sensing variations of the separation between the elements as a function of variations in rate of crop feed, translating said variations of separation into varying flow of fluid in a fluid supply path in said combine, varying the output of fluid pressure means connected to said supply path in response to said variations of fluid flow, said fluid pressure means serving to maintain the optimum rate of feed of crop to said combine in the operation of said combine.

References Cited

UNITED STATES PATENTS 3,073,099  1/1963  Andersen _____ 56—20
3,093,946  6/1963  Pitt et al. _____ 56—20

ANTONIO F. GUIDA, *Primary Examiner.*

UNITED STATES PATENT OFFICE

CERTIFICATE OF CORRECTION

Patent No. 3,442,068            Dated May 6, 1969

S. A. Bulin

It is certified that error appears in the above-identified patent and that said Letters Patent are hereby corrected as shown below:

Column 2, lines 42 through 63 should read as follows:

--Also, it is to be understood that the phraseology and terminology employed herein is for the purpose of description and not of limitation.
    AS SHOWN ON THE DRAWINGS:
    Figure 1 of the drawings generally discloses a combine 100 which has the present invention incorporated therein and which includes wheels 102 (only one being shown) driven by an engine 104 through a differential and transmission 106. The driving connection may include belts 108 and 110 with a plurality of pulleys 112 supporting the belts. At least one of the pulleys 112 has relatively movable elements to provide a variable speed mechanism and preferably the elements are adjustable through a hydraulic control device, as will become apparent hereinafter. The combine 100 also includes a header 114 adapted to be raised and lowered about a pivot axis 116.
    In Figure 2, there is shown a threshing cylinder 10 and an associated paraxial concave member 12 employed in the combine 100. Pivotally attached on a pin 14 on the combine 100, is a lever arm 16. The concave member 12 is attached to the lever arm 16 by rods 18 and 28.--

SIGNED AND SEALED
APR 14 1970

(SEAL)
Attest:

Edward M. Fletcher, Jr.

Attesting Officer

WILLIAM E. SCHUYLER, JR.
Commissioner of Patents